Re 13051
12-7-1909
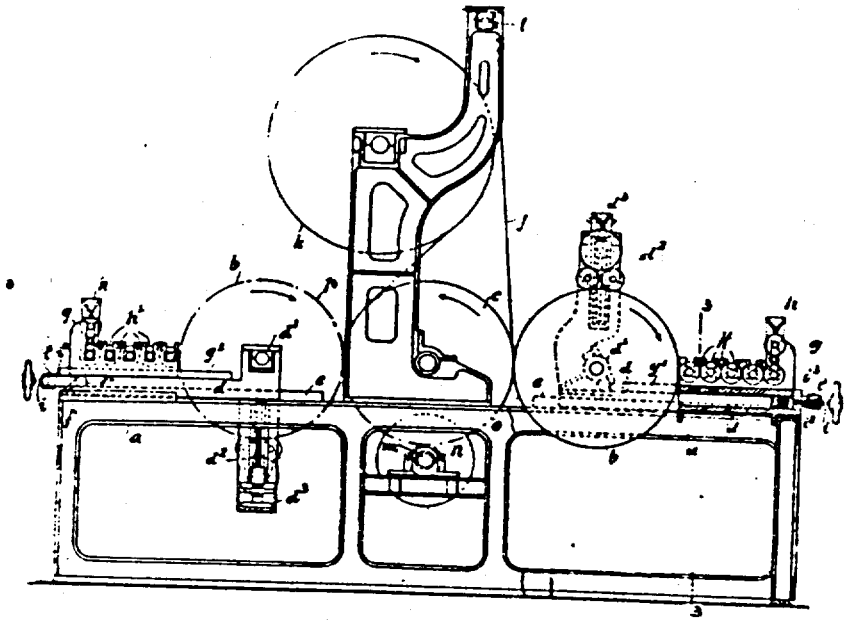

UNITED STATES PATENT OFFICE.

JOHN ARTHUR JEFFERSON HAYES, OF MANCHESTER, ENGLAND.

PRINTING MACHINERY.

13,051. Specification of Reissued Letters Patent. Reissued Dec. 7, 1909.

Original No. 909,591, dated January 12, 1909, Serial No. 424,126. Application for reissue filed July 17, 1909. Serial No. 508,255.

*To all whom it may concern:*

Be it known that I, JOHN ARTHUR JEFFERSON HAYES, a subject of the King of Great Britain, residing at 21 Spring Gardens, Manchester, Lancashire, England, have invented new and useful Improvements in Printing Machinery, of which the following is a specification.

This invention relates to continuous rotary printing machines particularly of the class operating with fatty inks or colors and by means of printing rollers, upon paper, textile fabrics, floor coverings, metal sheets and the like.

According to the invention all those parts of the machine which, upon a change of color or ink or design being required, have, in the ordinary course, to be removed or cleaned, are mounted upon a frame or frames, which frame or frames is or are made detachable from the main frame-work of the printing machine, so that when a change of color or design is to be made, the frame containing all the parts for feeding, impressing or otherwise dealing with such color or design may be detached bodily from the machine to be immediately replaced by another frame having its attached members more or less completely prepared for immediate work.

According to the process of printing employed and the construction of the machine, other parts besides those carrying the ink may be fitted to the removable frame to be moved therewith.

The invention consists further in the provision of a carriage which is adapted to run upon rails or otherwise up to the printing machine and to receive the removable frame or frames directly from the machine and to carry them away for cleaning or other attention as desired, the said carriages also serve to supply fresh frames having the operative parts ready prepared for printing.

In the case of a machine employing a number of printing rollers or sets of printing rollers, the removable frames may be arranged one above the other, and in this case the carriage is advantageously constructed with several tiers or platforms for receiving the several superimposed removable frames, which can be transferred simultaneously from the machine to the carriage or vice versa.

To enable the invention to be fully understood it will now be described by reference to the accompanying drawing, in which:—

Figure 1 is a sectional side elevation of a continuous rotary lithographic machine having the improvements applied thereto. Fig. 2 is a part sectional plan thereof. Fig. 3 is a section on the line 3—3, Fig. 1. Fig. 4 is a front view of a suitable form of carriage for receiving the removable frame or frames from the machine, and Fig. 5 is a side elevation thereof. Fig. 6 is an elevation of a continuous rotary lithographic printing machine provided with a plurality of pressure rollers vertically superposed, and having the improvements applied thereto.

Referring first to Figs. 1, 2 and 3, *a* represents the frame of the continuous rotary lithographic machine which is adapted for printing in two colors. *b*, *b*, are two printing rollers which act in conjunction with a common impression roller *c*. Each of the printing rollers *b* is mounted upon the removable frame *d*, that is to say, in bearings *d'*, *d'*, secured to the said frame *d*. The latter is adapted to slide on undercut guides *e*, *e*, upon the main frame *a* so that it can be passed on to and removed from the frame *a* in a horizontal direction. To lock it in place the main frame is provided on either side with a rack *f* with which engages a pawl *f'* pivoted to the sliding frame *d*. The brackets carrying the bearings *d'* are extended, as shown at $d^2$, and carry the damping apparatus $d^3$ for the printing roller *b*. Upon each of the frames *d* there is mounted a secondary frame *g* adapted to slide on guides *g'* on the frame *d*, this secondary frame *g* carrying the color box *h* and distributing rollers *h'*, together with the usual accessories. The frame *g* can be horizontally slid on to, and removed from, the frame *d* and is locked in position by means of the handscrew *i* which passes through the nut *i'* upon a bail or stirrup $i^2$ pivoted on each side of the sliding frame *d*. The inner end of the screw *i* bears against a spring plug or buffer $i^3$ and when tightened presses the innermost distributing roller against the periphery of the printing roller *b*. It will, therefore be seen that the frame *g* can be removed from the frame *d* by unscrewing the hand-screw *i* and turning down the bail or stirrup $i^2$. Also, that the frame *d* can be removed from the main frame *a* either before or after the subsidiary frame $g$ has been removed. $j$ represents the material to be printed which passes from the roll $k$ around the impression roller $c$ and between the said impression roller and the two printing rollers $b$, $b$, whence it is conveyed away over the guide-roller $l$ and stored upon a drum or in any other convenient manner.

In the construction of printing machine described above, power is imparted from any convenient source to the main shaft $m$ upon which are mounted the two toothed wheels $n$, $n$, gearing respectively with two toothed wheels, $o$, $o$, upon the shaft, $c'$, of the impression roller $c$. The toothed wheels $o$, $o$, also gear on either side with toothed wheels $p$, $p$, upon each end of the two printing rollers $b$, $b$, the said wheels $p$, $p$, gearing with the train of wheels $h^2$ on the rollers $h'$.

With this construction of machine it will be obvious that should it be necessary to effect a change of color or ink or of the design to be printed or of the size of the printing roller, it is merely necessary to remove the frame $g$ or the frame $d$ together with the frame $g$ and to replace the said frame or frames with a substitute or substitutes containing the required color or ink or design upon the printing roller. To facilitate the manipulation of the frames in this way use is advantageously made of a carriage such as that illustrated in Figs. 4 and 5, that is to say, a carriage comprising a body $q$, the top of which is shaped, as shown at $q'$, to receive the frame $d$, when the said frame is removed from the printing machine, either alone or together with the frame $g$. When the frame $g$ is to be removed, leaving the frame $d$ in the printing machine, a detachable top $r$, shown in broken lines in Fig. 5, is placed upon the top of the body. The body is mounted upon the wheels $s$, $s$, preferably arranged to run upon rails.

In the machine illustrated in Fig. 6, two pairs of printing rollers $k'$, $k'$ and $l'$, $l'$ are arranged vertically one above the other, the two rollers of each pair bearing against opposite sides of the upper and lower impression rollers $m'$, $n'$, respectively, and $o'$, $o'$ and $p'$, $p'$ are the inking or color accessories. The printing rollers $k'$, $k'$ and $l'$, $l'$ are mounted upon movable frames $l^2$, $l^2$ sliding in the main frame of the machine, the said movable frames being arranged in pairs vertically one above the other and being constructed as hereinbefore described with reference to Figs. 1, 2, 3, 4 and 5. The inking or color accessories $o'$, $o'$ and $p'$, $p'$ are mounted upon the movable frames $o^2$, $o^2$, and $p^2$, $p^2$, respectively, the said frames being adapted to slide in guides upon the frames $l^2$, $l^2$ carrying the printing rollers $k'$, $k'$ and $l'$, $l'$. $q^2$ is the roll of material to be printed, the said material $q^3$ passing first between the left hand printing roller $k'$ and the upper impression roller $m'$ and thence passing down between the left hand printing roller $l'$ and lower impression roller $n'$ around the latter of which it passes and emerges between the said roller and the right hand lower printing roller $l'$ after which it passes between the upper impression roller $m'$ and the right hand printing roller $k'$ and is conveyed away over the guide pulley $r'$, to a drum or other convenient means of storing.

$s'$, $s'$, $s'$, are rollers the peripheries of which are furnished with a substance such as powdered French chalk with which the surface of the material $q^3$ to be printed makes contact between each impression, the object being to dry the said surface after each impression before the next impression is effected.

It is obvious that with a machine of the above described construction, both the inking or color accessories and the printing rollers may be readily run off the main frame of the machine and removed with the aid of a carriage of the kind shown in Figs. 4 and 5, such carriage being provided with a number of tiers or platforms corresponding to the number of the superposed removable frames upon which the inking or color accessories and the printing rollers are mounted.

Having now fully described and ascertained my said invention and the manner in which it is to be performed, I declare that what I claim is:—

1. In a printing machine, the combination with a main frame having an impression cylinder mounted in fixed bearings thereon, the said main frame being provided with guide ways running longitudinally thereof and extending to the outer end of the machine, of a frame adapted to engage and be moved in said guide ways toward said impression roller and removable from the frame by moving said frame in said guide ways out of engagement therewith and free from the frame, a printing cylinder mounted upon said sliding frame in position to be brought into proper relation with the impression roller, said printing roller frame being provided with guide ways of a like character to those of the main frame and a further frame carrying inking devices adapted to be placed into engagement with and moved toward the printing roller and also movable outwardly along the guide ways out of the printing roller frame, said printing roller frame being also provided with a bail and screw to secure the inking frame in operative position, substantially as described.

2. In a printing machine, the combination with a main frame, and an impression roller mounted thereon, of a series of independent frames each carrying a printing roller and each frame being independently movable on the main frame and independently removable therefrom, and a series of frames each mounted on one of said printing roller frames, and provided with inking devices each of said inking frames being movable on and removable from its printing roller frame, substantially as described.

3. In a printing machine, the combination with the main frame provided with a series of guide ways, of an impression roller mounted in fixed bearings therein, of a series of independent frames each movably mounted and adapted to slide in one of said guide ways, a printing roller and a damping device mounted on each of said sliding frames and inking devices removably secured to each of said sliding frames, substantially as described.

JOHN ARTHUR JEFFERSON HAYES.

Witnesses:

ERNALD SIMPSON MOSELEY,

MALCOLM SMETHURST.